United States Patent
Hayashi et al.

(10) Patent No.: US 10,287,105 B2
(45) Date of Patent: May 14, 2019

(54) CONVEYING APPARATUSES

(71) Applicant: FUJI MACHINERY CO., LTD., Nagoya, Aichi (JP)

(72) Inventors: Kazuki Hayashi, Nagoya (JP); Sayumi Kato, Nagoya (JP); Masanori Hashimoto, Nagoya (JP)

(73) Assignee: FUJI MACHINERY CO., LTD., Nagoya, Aichi (JP)

( * ) Notice: Subject to any disclaimer, the term of this patent is extended or adjusted under 35 U.S.C. 154(b) by 0 days.

(21) Appl. No.: 16/145,302

(22) Filed: Sep. 28, 2018

(65) Prior Publication Data
US 2019/0100387 A1    Apr. 4, 2019

(30) Foreign Application Priority Data

Sep. 29, 2017   (JP) ................................ 2017-190860

(51) Int. Cl.
*B65B 35/40*   (2006.01)
*B65B 59/02*   (2006.01)
*B65G 47/32*   (2006.01)
*B65G 54/02*   (2006.01)

(52) U.S. Cl.
CPC .............. *B65G 47/32* (2013.01); *B65B 35/40* (2013.01); *B65B 59/02* (2013.01); *B65G 54/02* (2013.01)

(58) Field of Classification Search
CPC ........ B65G 47/32; B65G 54/02; B65G 47/88; B65G 25/08; B65G 43/08; B65G 47/08; B65G 47/26; B65G 47/31; B65B 35/40; B65B 59/02
See application file for complete search history.

(56) References Cited

U.S. PATENT DOCUMENTS

| | | | |
|---|---|---|---|
| 6,191,507 B1* | 2/2001 | Peltier ................... | B65G 54/02 310/12.02 |
| 6,876,107 B2* | 4/2005 | Jacobs ................... | B60L 15/38 310/12.19 |
| 7,942,254 B2* | 5/2011 | Schell ................... | B31D 3/007 198/419.3 |
| 8,096,409 B2* | 1/2012 | Wipf ..................... | B65G 19/02 198/728 |
| 9,051,132 B2* | 6/2015 | van de Loecht ....... | B65G 47/31 |

(Continued)

FOREIGN PATENT DOCUMENTS

DE    102008040204 A1    1/2010
DE    102011075176 A1    11/2012
(Continued)

OTHER PUBLICATIONS

European Search Report dated Mar. 1, 2019, for European Application No. 18197701.8 (5 p.).

*Primary Examiner* — Mark A Deuble
(74) *Attorney, Agent, or Firm* — Conley Rose, P.C.

(57) ABSTRACT

A conveying apparatus includes a circulation track and a plurality of travelers movable along the circulation track under a control of a controller for conveying articles. If no preceding article-conveying traveler exists on the front side of one of the travelers planned for receiving and conveying the article detected by a detection section, the planned traveler serves as a no-article conveying traveler, and the other traveler located adjacent the planned traveler serves as an article conveying traveler.

6 Claims, 8 Drawing Sheets

(56) References Cited

U.S. PATENT DOCUMENTS

| | | | |
|---|---|---|---|
| 9,061,838 B2* | 6/2015 | van de Loecht | B65G 47/31 |
| 10,046,923 B2* | 8/2018 | Wagner | B65G 47/31 |
| 10,173,848 B2* | 1/2019 | Wipf | B65G 47/088 |
| 2010/0084247 A1* | 4/2010 | Wipf | B65G 19/02 198/617 |
| 2014/0083817 A1* | 3/2014 | van de Loecht | B65G 47/841 198/459.8 |
| 2014/0138212 A1* | 5/2014 | van de Loecht | B65G 47/31 198/461.1 |
| 2015/0136564 A1 | 5/2015 | Hurni et al. | |

FOREIGN PATENT DOCUMENTS

| | | |
|---|---|---|
| DE | 102013105175 A1 | 11/2014 |
| EP | 2743192 A1 | 6/2014 |
| JP | 2015525176 A | 9/2015 |

* cited by examiner

CONVEYING APPARATUSES

CROSS-REFERENCE TO RELATED APPLICATIONS

This application claims benefit of Japanese patent application serial number 2017-190860 filed on Sep. 29, 2017, which is hereby incorporated herein by reference in its entirey.

STATEMENT REGARDING FEDERALLY SPONSORED RESEARCH OR DEVELOPMENT

Not applicable.

BACKGROUND

Embodiments of the present disclosure generally relate to conveying apparatuses for conveying articles that may be received one by one, to a processing apparatus, such as a packaging machine, located on a downstream side of the conveying apparatus.

A technique has been known to use a conveyer that relies on linear movement for conveying articles one after another from an upstream-side apparatus, such as a manufacturing apparatus, to a conveyer of a downstream-side apparatus, such as a packaging machine. For example, JP-A-2015-525176 (also published as US2015/0136564) discloses a conveying apparatus including pushing members supported by travelers that are mutually independently driven such that each traveler travels along a loop-shaped path. The pushing members may push and feed the articles one after another such that the articles are slid along a conveying plane toward a conveyor of a packaging machine located on the downstream side of the conveying apparatus.

With the conveying apparatus disclosed in JP-A-2015-525176, the traveling speed of each of the travelers may be increased or decreased to match the timing at which the articles delivered one after another with the conveyer located on the downstream side. However, if the travelling speed of the traveler is decreased while the pushing member supported by the traveler is engaging the article, the article may move forwardly away from the pushing member and corresponding traveler by the inertia force. In such a scenario, the articles arriving one after another at the conveying apparatus, with the possible exception of the article at the leading positon (i.e., the leading article), may abut the immediately preceding pushing members, which may sufficiently restrict their positions to ensure any deviations from proper timing for feeding the articles to the conveyor on the downstream side may be within a tolerable range. However, because there is no preceding pushing member for the leading article, the leading article may move forwardly away from the corresponding pushing member and corresponding traveler by a large distance when the travelling speed of the corresponding traveler is decreased. Consequently, the leading article may be fed to the downstream side conveyor at improper timing that deviates from the proper timing outside the tolerable range. For example, if the packaging machine having the downstream side conveyor is a horizontal form-fill-seal packaging machine, a problem may arise when a crosswise seal device engages (interferes with) the leading article when the crosswise seal device forms a crosswise seal on a tubular formed film along a direction intersecting a feeding direction of the film.

Therefore, there has been a need in the art for conveying apparatuses that include pushing members movable independently of each other and that can feed articles one after another at suitable timing that matches to process timing of a processing machine located on a downstream side of the conveying apparatus.

SUMMARY

In one aspect according to the present disclosure, a conveying apparatus may include a support section configured to support a plurality of articles thereon and disposed between a receiving section for receiving the articles and a feeding section for feeding the articles to a processing machine. The conveying apparatus may further include a detection section configured to detect an arrival of each of the articles at the receiving section, a circulation track having a magnetic field generating device configured to generate a magnetic field(s), and a plurality of travelers movable along the circulation track independently of each other by driving forces produced by the magnetic field(s) of the magnetic field generating device. For example, the magnetic field generating device may be a plurality of stators. Each of the travelers may have a first pushing member supported thereon. The plurality of travelers may push the articles arriving at the receiving section one after another to move the articles to the feeding section along the support section. The conveying apparatus may further include a controller configured to adjust distances between adjacent travelers and a travelling speed of each of the travelers, which push the corresponding articles, during the movement of the articles along the support section in a front direction, so that the articles are fed from the feeding section to the processing machine to match article process timing at predetermined intervals of the processing machine. The controller may be further configured to associate any one of the travelers with each of the articles before arriving at the receiving section based on detection information of the detection section and to output a command so that, when each of the articles arrives at the receiving section, a driving force is applied to the traveler associated with the arrived article in order to push the corresponding article to reach the feeding section. The controller may include a timing acquisition section and a determination section. The timing acquisition section may acquire information regarding the article process timing of the processing machine. The determination section may determine, in conjunction with the association of one of the travelers with each of the articles and based on the information regarding the process timing, whether or not the article subjected to the association can arrive at the feeding section at the process timing for arrival at the feeding section, which is directly subsequent to the process timing when the article directly preceding the article subjected to the association arrives at the feeding section. If the determination by the determination section is that the article subjected to the association cannot arrive at the feeding section at the process timing for arrival at the feeding section, in order that the other one of the first pushing members, which is different from the first pushing member pushing the article subjected to the association and pushes no article, travels on a front side in a moving direction of the article subjected to the association, the controller associates the article subjected to the association with two of the plurality of travelers, and the controller adjusts a distance in the moving direction between the first pushing member pushing the article subjected to the association and the other one of the first pushing members and also adjust moving speeds thereof to match the article process timing of the processing machine.

With the controller configured as described above, the leading article subjected to the association and pushed by the first pushing member may be prevented from moving forwardly away from the first pushing member by a large distance by the other one of the first pushing members, while the distance between these two first pushing members and the moving speeds of the two first pushing members are adjusted to match the article process timing of the processing machine. Two first pushing members associated with each of the articles following the leading article also may be adjusted in the same manner as those for the leading article to feed each article at timing that matches the article process timing.

As a result, it is possible that the first pushing members that move independently of each other can convey the articles one after another in such a manner that the articles are fed to match the process timing of the processing machine located on the downstream side of the conveying apparatus.

In one embodiment, one of the first pushing members including the other one of the first pushing members may be moved according to a fixed motion to push the article subjected to the association to the feeding section after the article subjected to the association has reached to a position immediately before the feeding section. The other first pushing member(s) positioned at the support section on the rear side of the first pushing member that pushes the article subjected to the association and has reached to a position immediately before the feeding section may be moved according to a fixed motion or a non-fixed motion to push the corresponding article.

By using a fixed motion for pushing the article to the feeding section by the first pushing member when the article has reached to a position immediately before the feeding section, it is possible to reliably adjust the timing of arrival of the article at the feeding section to match the process timing of the processing machine. Further, by using a fixed motion or a non-fixed motion for moving the first pushing members positioned on the rear side of the first pushing member that pushes the article subjected to the association, it may be possible to transfer each article at appropriate timing to match the process timing of the processing machine even in the case where the articles are irregularly supplied to the receiving section.

In another embodiment, each of the travelers may include a first engaging member and may rotatably support the first pushing member. The circulation track may include a linear track extending along the support section and a curved track connected to the linear track. A second engaging member may engage the first engaging member of each of the travelers and may be disposed along the circulation track within a transition region for transition from the linear track to the curved track. The transition region may be opposed to the feeding section. Each of the travelers may be configured such that a tip end portion of the first pushing member is moved rearward as the first engaging member engages the second engaging member.

With this construction, the tip end portion of the first pushing member may move rearward as the first engaging member engages the second engaging member during transition from the linear track to the curved track. Therefore, the tip end portion may not push the article forwardly. As a result, it is possible to avoid undesirable displacement of the article.

In a further embodiment, the processing machine may include a conveyor having a supporting surface and may further include a plurality of second pushing members configured to push the articles at predetermined intervals. The supporting surface may be connected to the support section on a downstream side thereof to define a conveying path for the articles in series with the support section. Each of the second pushing members may be configured such that a tip end portion of each second pushing member starts to enter the conveying path from an upstream side of the feeding section. An orientation of the tip end portion may be gradually changed as the tip end portion moves toward a downstream side, and tip end portion may reach to an uprise position when arrived at the feeding section. Each of the first pushing members includes a restricting portion extending rearward from a tip end thereof. The restricting portion may have a length that is shorter than a subtraction of a length of each article in the pushing direction from a distance between two adjacent first pushing members in the pushing direction. After the tip end portion of each of the second pushing members starts to enter the conveying path and before the tip end portion completes to uprise, the restricting portion may move in a pushing direction without contacting the second pushing members while the restricting portion overlaps with one of the second pushing members as viewed in a direction crossing the pushing direction.

With this arrangement, after the tip end portion of each of the second pushing members starts to enter the conveying path and before the tip end portion completes to uprise, the restricting portion of each of the first pushing members moves in the pushing direction without contacting the second pushing members while the restricting portion overlaps with one of the second pushing members as viewed in a direction crossing the pushing direction. Therefore, each article located within a distance between the two adjacent first pushing members in the front-to-rear direction may avoid potential interference with the corresponding second pushing member.

DETAILED DESCRIPTION

Figure 1:
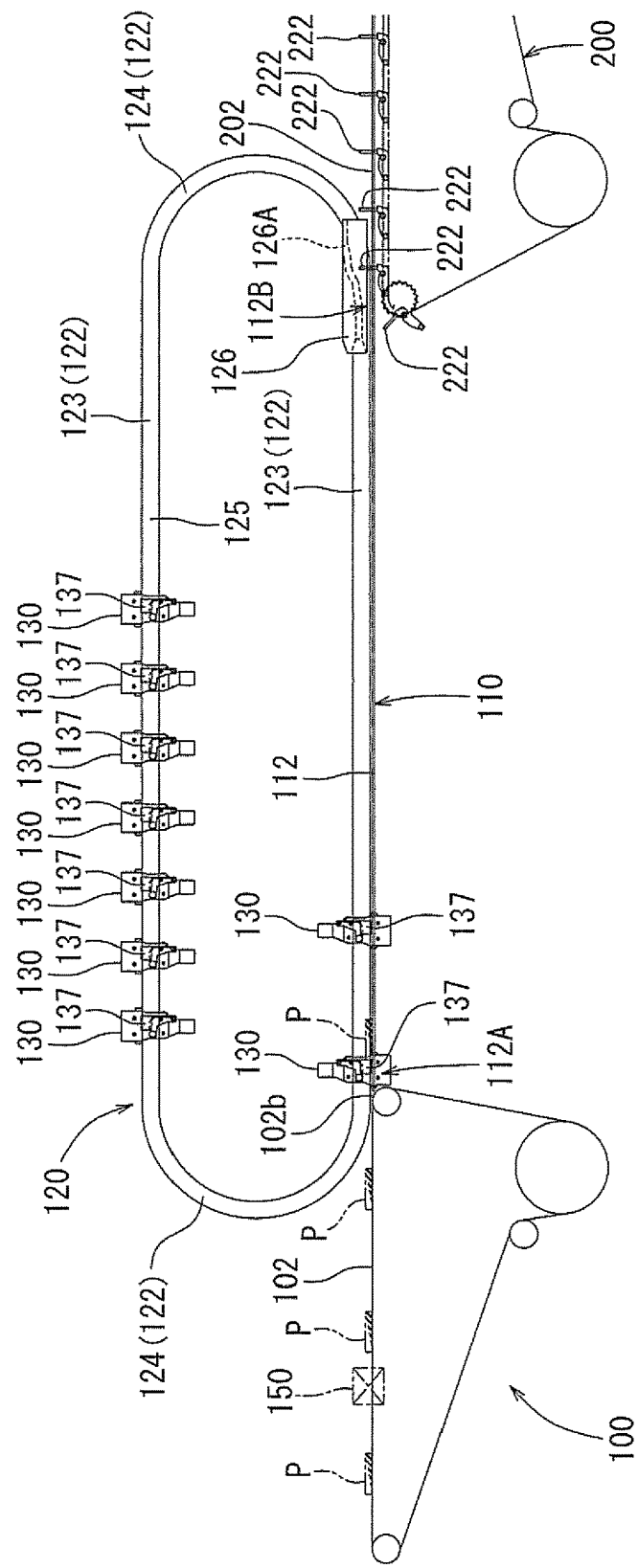
FIG. 1 is a front view of a conveying machine according to a representative embodiment and illustrating a state where a leading one of the articles is conveyed by the conveying machine toward a processing machine.
Figure 2:
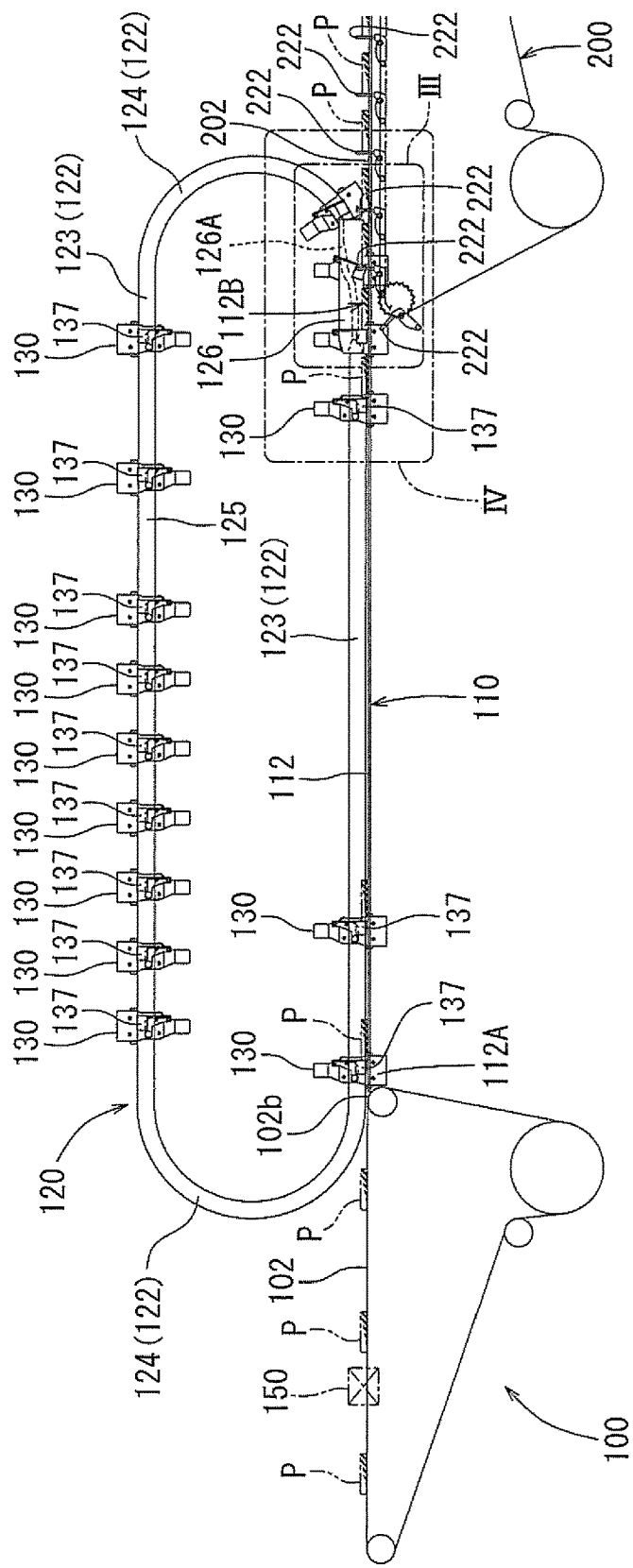
FIG. 2 is a front view of the conveying machine of FIG. 1 illustrating a state where the articles conveyed one after another are transferred to the processing machine.

A representative embodiment will now be described with reference to the drawings. Referring to FIGS. 1 and 2, there is shown a conveying apparatus that may generally include a receiving section 112A, a plurality of first pushing members 137, and a feeding section 112B. The receiving section 112A receive articles P one after another. The plurality of first pushing members 137 travel along a circulation track 122 independently of each other and feed the articles P while the distance between each pair of adjacent articles P in a pushing direction (left to right in FIGS. 1 and 2) and the travelling speed of each first pushing member 137 are adjusted. The articles P may be fed from the feeding section 112B to a processing machine, such as a horizontal form-fill-seal packaging machine, at timing matched to process timing of predetermined intervals for processing by the processing machine.

As shown in FIG. 1, the conveying apparatus also include a first conveying bed 110 that functions as an article support section and has a flat conveying surface 112 on which the articles P discharged from a first conveyor 100 are placed. In addition, the conveying apparatus includes a second conveyor 120, a controller 140 (see FIG. 5) for controlling the second conveyor 120, and an article detection section 150 (i.e., an article sensor) for detecting the articles P. In this embodiment, the second conveyor 120 is an overhead-type conveyor disposed on the upper side of the first conveying bed 110 and includes the plurality of first pushing members 137 and the circulation track 122.

The first conveyor 100 includes a conveyor surface 102 formed by an endless belt, on which the articles P are discharged at irregular intervals (i.e., random intervals) from a manufacturing apparatus (not shown) located on an upstream side of the first conveyor 100. The conveyor surface 102 may move at a constant speed for feeding the articles P to the first conveying bed 110 via the receiving section 112A. For this purpose, a downstream-side end 102b of the conveying surface 102 is coupled to the first conveying bed 110 at the receiving section 112A.

In this way, the first conveying bed 110 is positioned on the downstream side of the first conveyor 100 such that the flat conveying surface 112 receives the articles P from the first conveyor 100 and supports the articles P such that the articles P can be moved linearly along the conveying surface 112.

The article detection section 150 is positioned on the lateral side in the widthwise direction of the first conveyor 100. The widthwise direction is generally perpendicular to the conveying direction. The article detection section 150 detects the articles 150 that arrive at the receiving section 112A. For example, the article detection section 150 may be a photoelectronic sensor.

A supply conveyor 200 is positioned on the downstream side of the first conveyor bed 110 and may form a part of the processing machine (a horizontal form-fill-seal packaging machine in this embodiment). The supply conveyor 200 includes a flat support surface 202 on which the articles P fed from the feeding section 112B of the first conveying bed 110 are placed one after another. More specifically, the support surface 202 is defined by an endless cable, and a plurality of second pushing members 222 may be attached to the outer periphery of the endless cable at regular intervals. Therefore, the articles P placed on the support surface 202 are be respectively pushed by the second pushing members 222 so that the articles P are conveyed at regular intervals at a constant speed. The supply conveyor 200 conveys the articles P at a given speed that may be set by the operator prior to the operation of the processing machine. For example, in the case that the supply conveyor 200 is a part of a horizontal form-fill-seal packaging machine, the given speed may be determined according to the number of packages formed per unit time (i.e., the processing capability). Therefore, the processing machine can process the articles P at process timing of regular intervals, and the process timing may conform to the timing for placing each of the articles P between two adjacent second pushing members 222 and may be synchronized with the timing for forming crosswise seals that will be explained later. For this purpose, the first conveying bed 110 is coupled to the support surface 202 of the supply conveyor 200 at the feeding section 112B.

In the horizontal form-fill packaging machine, a web-like film unwound from a film roll serving as a film stock is processed by a film forming device that folds the film such that opposite side edges in the widthwise direction of the film are lapped with each other. The lapped side edges may be sealed in the lengthwise direction by a lengthwise sealing device, so that the film may be formed into a tubular film. The supply conveyor 200 may supply the articles P into the tubular film at predetermined intervals while an end sealer may seal the tubular film in a direction transverse to the transferring direction at positions on a front side and a rear side with respect to the transferring direction of each of the articles. After that, the tubular film may be cut at the transverse seal portions, so that a plurality of packages each containing the article P can be manufactured. A controller 230 shown in FIG. 5 controls the operations of the horizontal form-fill packaging machine, including the operation for feeding the film, the operations for forming the lengthwise seal and the transverse seal, and the operation for supplying the articles P into the tubular film according to a target number of packages per unit time, which can be set to the controller 230.

The overhead-type second conveyor 120 includes a pair of parallel linear rails 123 and a pair of curved rails 124. The pair of linear rails 123 are spaced vertically from each other, and each of the linear rails 23 extends in the horizontal direction to define a linear movement path. The pair of curved rails 124 are joined to opposite ends of the pair of linear rails 123, so that the pair of linear rails 123 and the pair of curved rails 124 jointly form a circulation track 122. In this embodiment, the circulation track 122 is an endless loop-shaped track.

A plurality of travelers 130 are arranged (supported) on the circulation track 122 such that they can travel in one direction along the circulation track 122 independently of each other by driving forces applied by a linear motor structure. The second conveyor 120 is provided with the controller 140 (see FIG. 5) that communicates with the controller 230 (see FIG. 5) of the processing machine (i.e., the horizontal form-fill packaging machine) for exchanging information therewith and outputs commands for applying driving forces to the travelers 130 based on suitable information, such as the article detection information input from the article detection section 150. Typically, each of the controllers 140, 230 may include a CPU and a memory that stores programs for performing various functions described above and/or later. In this embodiment, the linear motor structure includes coils 125 and permanent magnets 132 (see FIG. 5). The coils 125 are disposed along the circulation track 122 and serve as stators for generating magnetic fields over the entire area of the circulation track 122. The permanent magnets 132 are respectively fixedly attached to the travelers 130 and serve as movable members. A supply of electric power to each of the coils 125 is controlled based on the command from the controller 140 of the second conveyor 120, so that the generation of the magnetic field of each of the coils 125 can be controlled, whereby the driving forces applied to the permanent magnets 132 can be controlled.

As shown in FIGS. 1 to 4, each of the travelers 130 of the conveying apparatus includes a body member 131 and a sensor 133 in addition to the permanent magnet 132 serving as the movable member. The body member 131 is slidably attached to the circulation track 122 (including the linear rails 123 and the curved rails 124) via a plurality of rollers 131R. The plurality of rollers 131R include two rows of rollers 131R arranged in a widthwise direction intersecting the extending direction of the circulation track 122. More specifically, the plurality of rollers 131R may include four rollers 131R arranged on the side of the first conveyor bed 110 and two rollers 131R arranged on the side opposite to the first conveyor bed 110. The four rollers 131R arranged on the side of the first conveyor bed 110 may include two rollers 131R arranged on the inner peripheral side of the circulation track 122 and two rollers 131R arranged on the outer peripheral side of the circulation track 122. In this embodiment, the pitch (i.e., a distance) between the two rollers 131R arranged on the outer peripheral side of the circulation track 122 is larger than the pitch (i.e., a distance) between the two rollers 131R arranged on the inner peripheral side. Therefore, the travelers 130 can move smoothly along the circulation track 122 even along the curved rails 124. The two rollers 131R arranged on the side opposite to the first conveyor bed 110 may be arranged on the outer peripheral side of the circulation track 122. Therefore, the travelers 130 do not fall from the circulation track 122 during travelling along the lower linear rail 123 with their first pushing members 137 oriented downward therefrom. The permanent magnet 132 functioning as the movable member is fixed within the body member 131 so as to face the coils 125 (i.e., the stators). The supply of electric power to the coils 125 is controlled such that a driving force for moving each of the travelers 130 along the circulation track 122 is generated through interaction between the magnetic flux produced by the coils 125 and the magnetic flux produced by each of the permanent magnets 132. In this embodiment, the sensor 133 is attached to the body member 131 for outputting a signal(s), such as a signal relating to information specific to the corresponding traveler 130, to the controller 140 (see FIG. 5). In general, the information specific to the corresponding traveler 130 may be an identification data for identification of the traveler 130, information regarding an error in movement of the traveler 130, etc.

Figure 3:
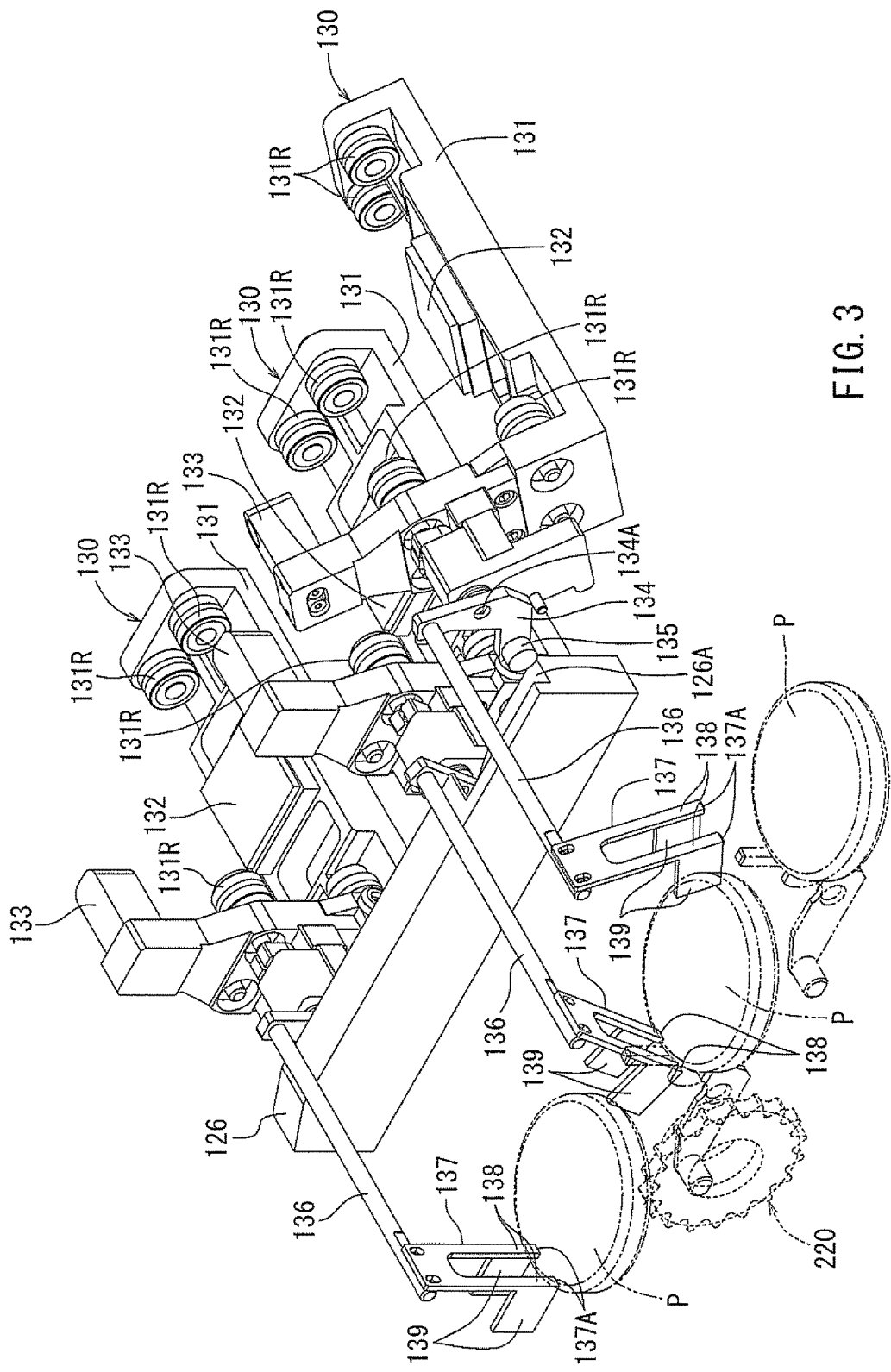
FIG. 3 is an enlarged partial perspective view of the conveying machine of FIG. 1 taken in section III of FIG. 2.
Figure 4:
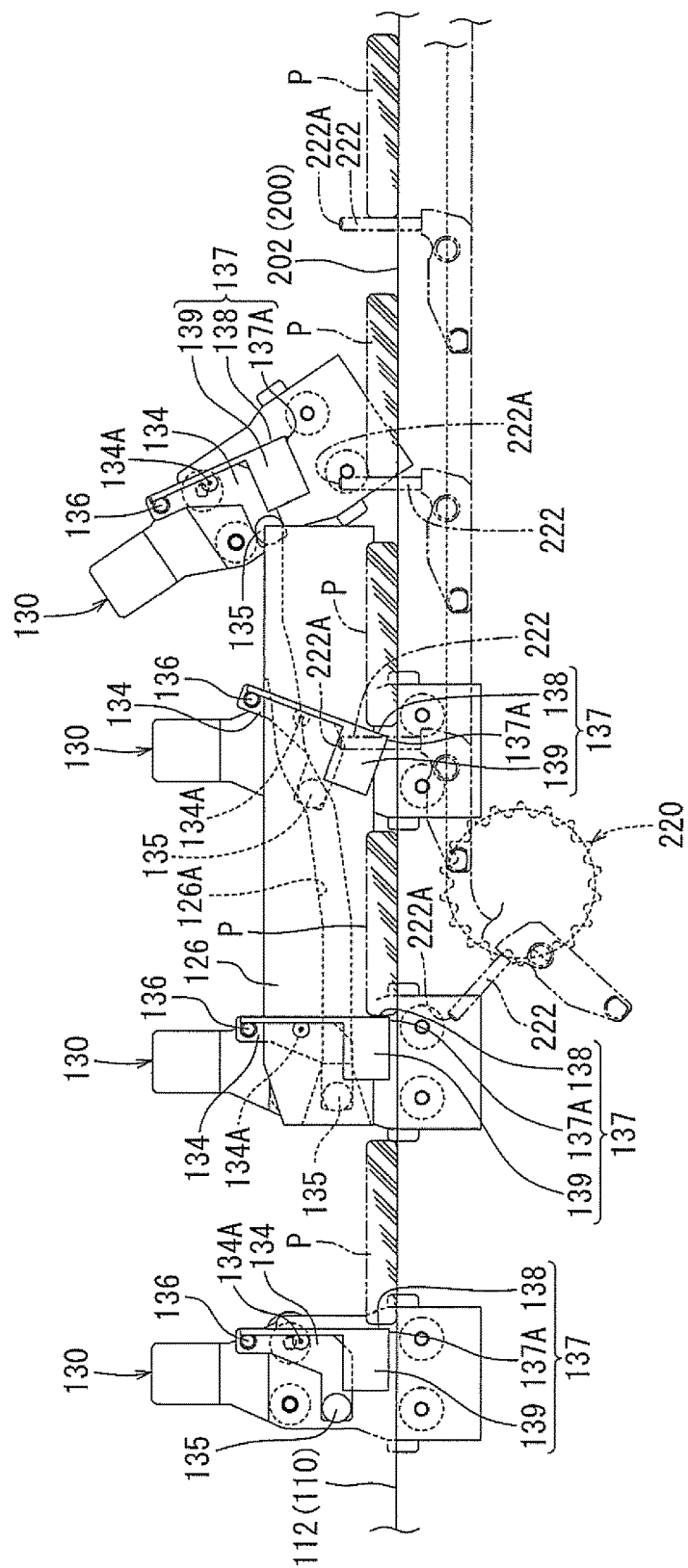
FIG. 4 is an enlarged partial front view of the conveying machine of FIG. 1 taken in section IV of FIG. 2.

The first pushing member 137 is attached to the traveler 130 at a position on the side of the first conveying bed 110 in the widthwise direction intersecting the extending direction of the circulation track 122. More specifically, as shown in FIG. 3, the traveler 130 includes a base portion 134 disposed on a lateral side of the body member 131 and pivotable about a support point 134A relative to the body member 131. A rod-like arm 136 extends in the widthwise direction from the base portion 134. The first pushing member 137 is fixedly attached to the tip end of the arm 136 and extends downward therefrom. In this embodiment, the first pushing member 137 has a shape of a flat plate with a central portion (with respect to the widthwise direction thereof) being cut out to avoid potential contact (interference) with a tip end portion 222A of the second pushing members 222. A pair of pushing surfaces 138 for pushing the article P are formed on the front side of the first pushing member 137. A pair of restricting portions 139 are disposed on the backside of the first pushing member 137 opposite to the pair of pushing surfaces 138. In this embodiment, each of the restricting portions 139 has a shape of a flat plate extending rearward from a front portion 137A of the first pushing member 137. A roller 135 serving as a cam follower is supported by the base portion 134. A guide member 126 having a cam groove 126A for engaging the roller 135 is positioned along a region of the circulation track 112 facing the feeding section 112B and transitioning from the lower linear rail 123 to the front side curved rail 124 as shown in FIG. 1.

Figure 5:
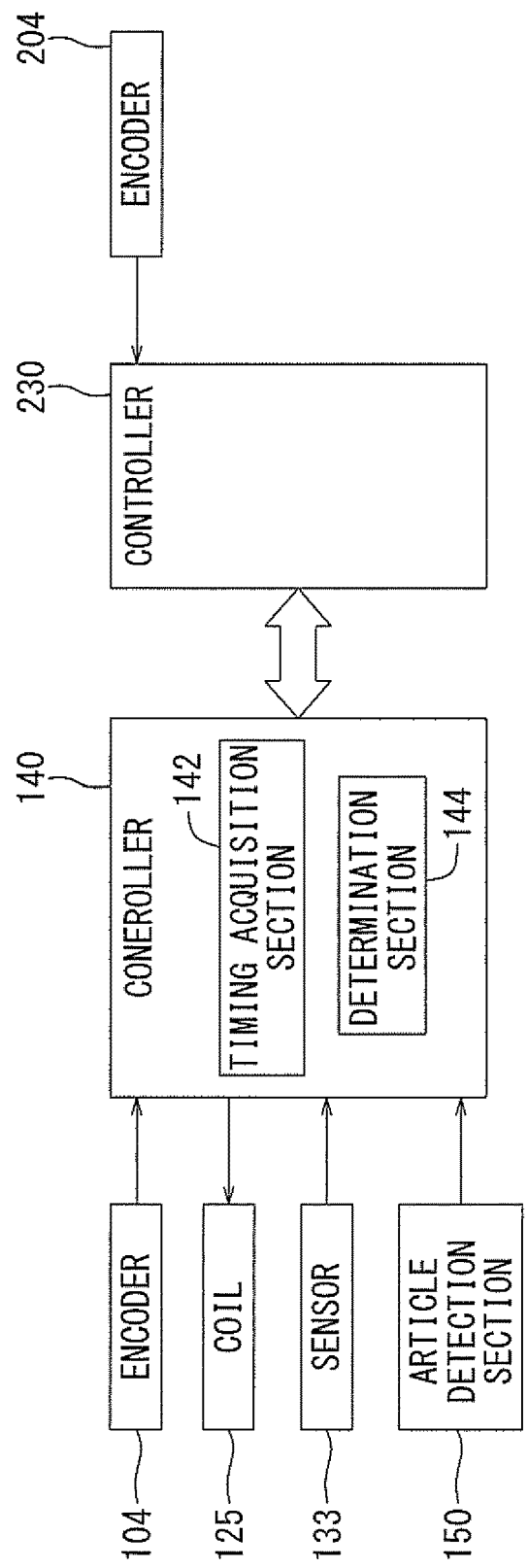
FIG. 5 is a schematic view of a control block diagram for the conveying machine of FIG. 1.

As shown in FIG. 5, the controller 140 of the second conveyor 120 includes a timing acquisition section 142 and a determination section 144. In this embodiment, the CPU of the controller 140 serves as the timing acquisition section 142 and the determination section 144 for performing the functions of these sections 142, 144 according to the programs stored in the memory. The timing acquisition section 142 acquires information regarding the timing for processing by the processing machine (i.e., the horizontal form-fill-seal packaging machine in this embodiment). The determination section 144 determines whether or not the articles P can uninterruptedly arrive at the feeding section 112B at timing corresponding to the process timing. Based on various information, the controller 140 of the second conveyor 120 produces command information relating to the pushing operation of the each of the travelers 130, such as the moving distance and/or the moving speed of each of the travelers 130, and subsequently sends commands to the coils 125 regarding the supply of current thereto. For example, the information based on which the command information is produced may include information regarding the positions of the travelers 130 received from the sensors 133 disposed at the travelers 130, information regarding detection of the articles P received from the article detection section 150, information regarding the arrival of the articles P at the receiving section 112A obtained based on a pulse signal outputted from an encoder 104 disposed at the first conveyor 100, and information regarding the moving positons of the second pushing members 222 obtained based on a pulse signal outputted from an encoder 204 disposed at the supply conveyor 200 and received from the controller 230 of processing machine (i.e., the horizontal form-fill-seal packaging machine). In this way, the travelers 130 may move (travel) according to the commands received from the controller 140 of the second conveyor 120 for applying the driving forces to the travelers 130. In this embodiment, the information regarding the moving positons of the second pushing members 222 is obtained based on the pulse signal that may be outputted from the encoder 204 disposed at the supply conveyor 200 and is received from the controller 230 of the horizontal form-fill-seal packaging machine. However, this information may be replaced with any other information regarding the processing operation of the packaging machine, such as information regarding positions of the crosswise seal formed by the crosswise seal device. The information regarding the processing operation may include registered information input to the controller 230 of the horizontal form-fill-seal packaging machine, and the information regarding the process timing of the supply conveyor 200. The registered information may include the number of packages formed per unit time, the length of the articles P in the conveying direction, the height of the articles P, and the length of the packages.

Next, the operation of the conveying apparatus will be described. As shown in FIGS. 1 and 5, the articles P discharged from the manufacturing apparatus located on the upstream side of the conveying apparatus are conveyed by the first conveyor 100 toward the first conveyor bed 110. The article detection section 150 detects the articles P arrived at the receiving section 112A and output the detection signal to the controller 140 at the time when each of the articles P arrives at the receiving section 112A. Upon receipt of the detection signal, the timing acquisition section 142 of the controller 140 acquires the information regarding the moving positions of the second pushing members 222 obtained from the pulse information of the encoder 204 disposed at the supply conveyor 200, and the determination section 144 makes the following determinations:

The determination section 144 determines the first pushing member 137 of one of the travelers 130 with which the detected article P should be associated (related), and the determination section 144 determines, based on the information regarding the process timing of the supply conveyor 200 acquired by the timing acquisition section 142, whether or not the detected article P can arrive at the feeding section 112B at receiving timing (process timing) for receiving by the supply conveyer 200, which is directly subsequent to receiving timing (process timing) when the preceding article P directly preceding the detected article P arrives at the feeding section 112B. In other words, it is determined whether or not the preceding second pushing member 222 directly preceding the second pushing member 222 that pushes the detected article P is set to push the preceding article P directly preceding the detected article P.

Such determination, in turn, enables determination as to whether or not the preceding pushing portion 137 directly preceding the first pushing member 137 that pushes the article P exists at the feeding section 112B. The preceding first pushing member 137 can restrict the pushed article P from moving forwardly by a set distance (that will be explained later) away from the pushing portion 137 that pushes the article P, so that the preceding first pushing member 137 can prevent the pushed article P from getting on the corresponding second pushing member 222 when the article P is transferred from the first conveyer bed 110 to the support surface 202 as the article P is pushed by the first pushing member 137 and conveyed to the feeding section 112B located on the downstream side of the first conveyor bed 110.

In the case where the directly preceding second pushing member 222 pushes the directly preceding article P as shown in FIG. 2, (i.e., in the case where the result of determination at the determination section 144 is YES), the controller 140 outputs a travel command to the traveler 130 associated with (related to) the detected article P, so that the first pushing member 137 of the associated traveler 130 moves to be positioned on the rear side of the detected article P at timing that matches the timing when the detected article P is transferred from the first conveyor 100 to the first conveying bed 110, and thereafter the first pushing member 137 of the associated traveler 130 pushes the detected article P to approach to the rear side of the preceding first pushing members 137 that may be accumulated at the feeding section 112B for feeding the articles P.

On the other hand, in the case where the directly preceding second pushing member 222 pushes no article P as shown in FIG. 1, (i.e., in the case where the result of determination at the determination section 144 is NO), the controller 140 outputs a travel command to the traveler 130 associated with the detected article P such that (a) the first pushing member 137 of the traveler 130 that normally serves to push the detected article P travels on the front side of the detected article P that arrives at the receiving section 112A whereby such first pushing member 137 functions to restrict the movement of the article P in the forward direction caused by the inertia force, and (b) the first pushing member 137 of the subsequent traveler 130 immediately trailing the traveler 130 associated with the detected article P functions to push the detected article P.

Figure 7:
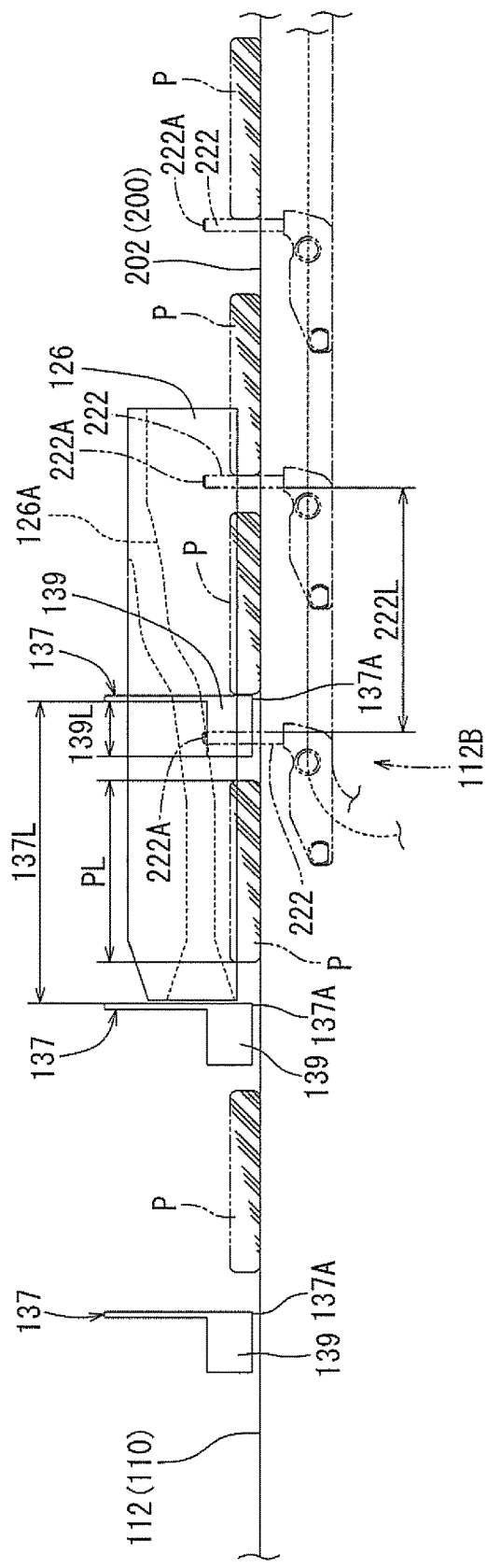
FIG. 7 is a partial front view similar to FIG. 6 but illustrating the positional relationship between one of the second pushing members completed to uprise, the corresponding restricting member, and the corresponding article.
Figure 8:
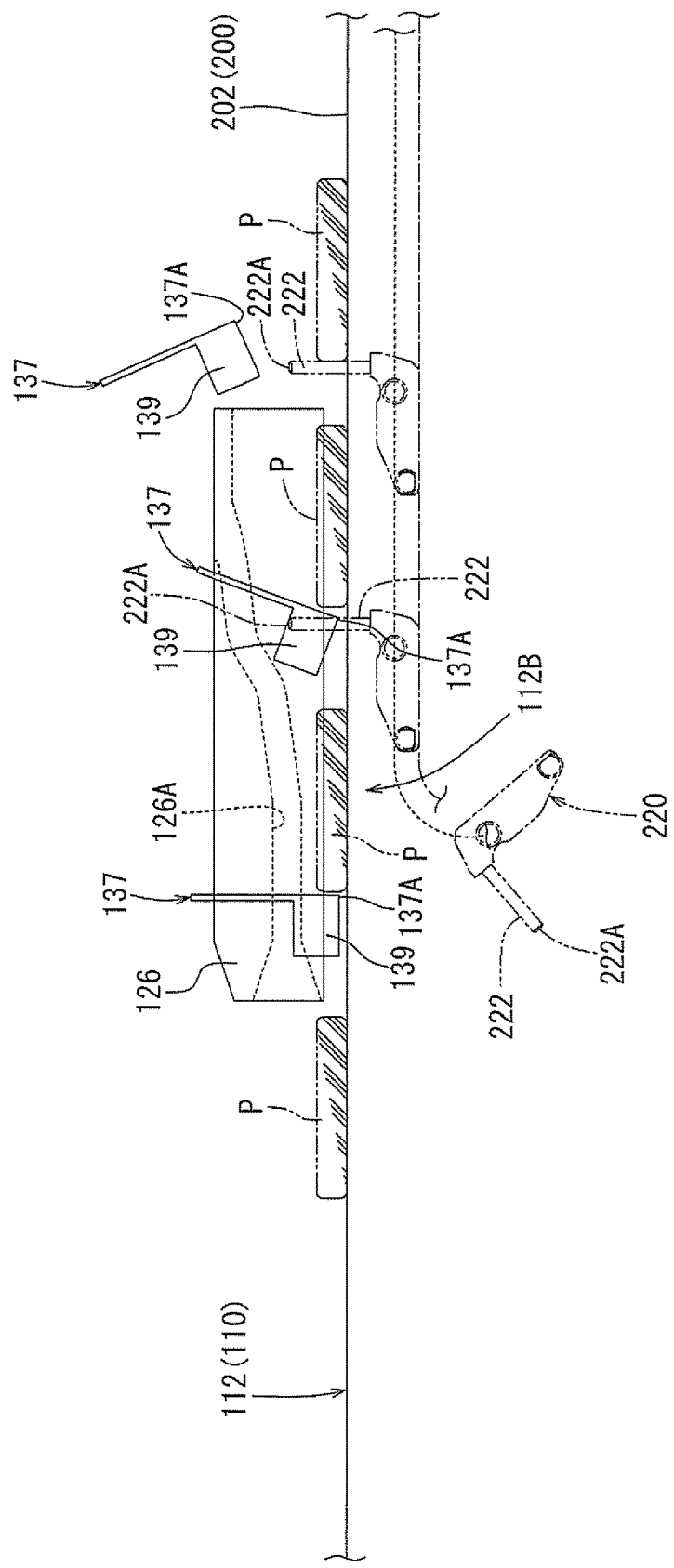
FIG. 8 is a partial front view of the conveying machine of FIG. 1 illustrating the state where a tip end portion of one of the first pushing members has been inclined rearward to be overlapped with the corresponding second pushing member.

During the initial stage of pushing the detected article P (see FIG. 1), a distance between the pair of first pushing members 137, including one first pushing member 137 to push the article P and the other first pushing member 137 preceding it, may be relatively large. However, the distance between the pair of first pushing members 137 can be gradually reduced as the first pushing member 137 pushing the article P moves toward the feeding section 112B by gradually increasing its moving speed. During the time immediately prior to reaching to the feeding section 112B until reaching the feeding section 112B, the article P is pushed at a predetermined speed, and a distance between the pair of first pushing members 137 in the front-to-rear direction (i.e., the conveying direction) is adjusted to be a distance 137L (see FIG. 7). The distance 137L can be set to be larger than a distance 222L between two adjacent second pushing members 222. In the case where the articles P are conveyed by the first conveyor 100 while the distances between them are relatively small, a predetermined number of articles P may be accumulated on the rear side of one of the articles P located immediately before the feeding section 112B. In such a case, the distance in the front-to-rear direction between the adjacent first pushing members 137 that push these accumulated articles P can be set to be equal to the distance 137L between the pair first pushing members 137 located immediately before the feeding section 112B.

Figure 6:
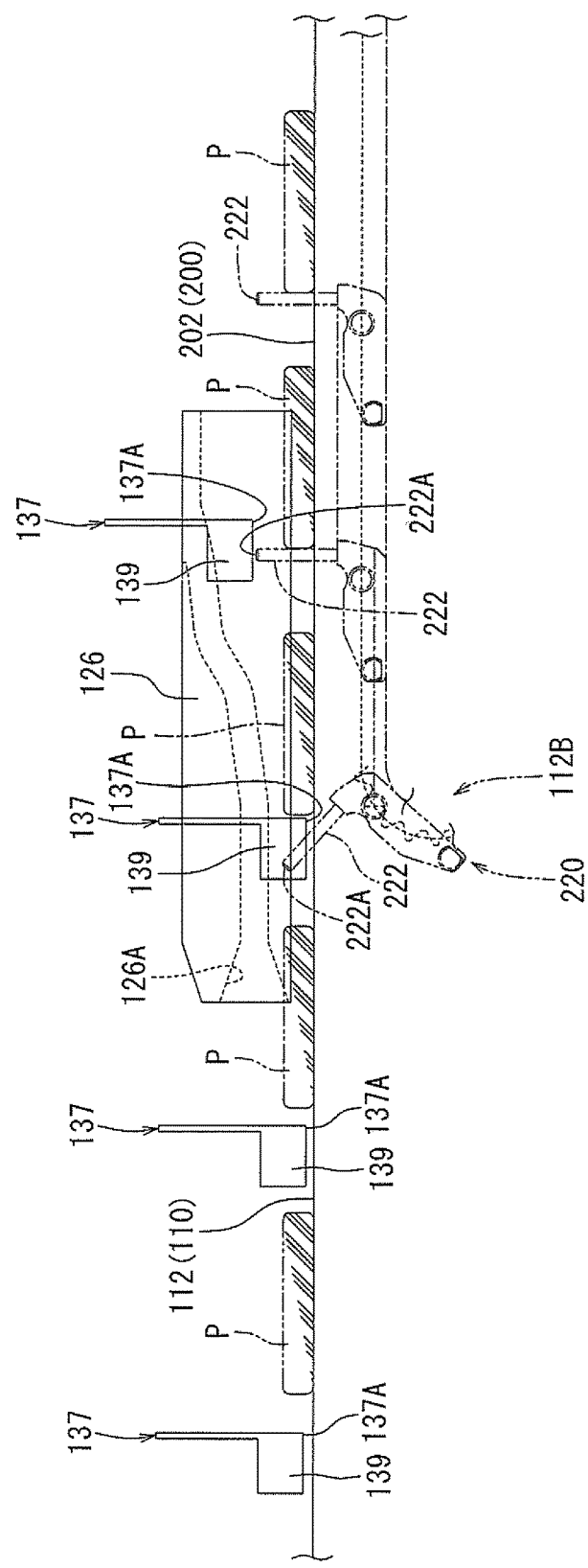
FIG. 6 is an enlarged partial front view of the conveying machine of FIG. 1 illustrating the positional relationship between restricting members of first pushing members and second pushing members, in particular, between one of the second pushing members started to uprise on the upper side of a support surface and the corresponding restricting member, and also illustrating the movement of the first pushing members.

As described previously and shown in FIGS. 3, 6 and 7, the first pushing member 137 includes the pair of restricting portions 139 extending rearward from the front portion 137A of the first pushing member 137. Each of the restricting portions 139 has a rearward extending length 139L measured from the front portion 137A. The length 139A is set such that before the tip end portion 222A of the second pushing member 222 pushing the article P finishes its rising movement (after starting to rise above the support surface 202 of the supply conveyor 200), the subsequent article P cannot contact the tip end portion 222A of the second pushing member 222. Here, a length obtained by subtracting the length 139L of each restricting portion 139 from the distance 137L between the two first pushing members 137 located immediately before the feeding section 112B is larger than a length PL of the articles P (i.e., distance 137L−length 139L>PL). In addition, the length obtained by subtracting the length 139L of each restricting portion 139 from the distance 137L may be smaller than the distance 222L between two adjacent second pushing members 222 (i.e., distance 137L−length 139L<distance 222L). In this embodiment, the tip end portion 222A of each of the second pushing members 222 starts the movement to extend across and above the conveyor surface 112 (i.e., the rising movement) at time before reaching to the feeding section 112B. The tip end portion 222A gradually changes its orientation as it moves toward the downstream side. The tip end portion 222A may finish the rising movement when it reaches to the feeding section 112B. During the movement of the tip end portion 222A of each of the second pushing members 222 after extending across and above the conveyor surface 112 and before finishing the rising movement, each restricting portion 139 moves in the pushing direction without contacting the second pushing member 222 while each restricting member 139 overlaps with the second pushing member 222 as viewed perpendicular to the pushing direction.

As explained previously and shown in FIG. 4, the guide member 126 having the cam groove 126A for engaging the roller 135 is disposed along the region of the circulation track 112 facing the feeding section 112B and transitioning from the lower linear rail 123 to the front side curved rail 124 as shown in FIG. 1. The guide member 126 is supported by a frame body (not shown) of the second conveyor 120 together with the linear rails 123 and the curved rails 124. As the roller 135 engages and moves along the cam groove 126A, the base portion 134 rotates to cause tilting movement of the tip end portion 137A of the first pushing member 137 in the rearward direction. Therefore, the first pushing member 137 may move forward without pushing the article P.

The second pushing members 222 may move at a predetermined speed that is slower than the moving speed of the first pushing members 137 while the distance between any two adjacent second pushing members 222 is kept at the distance 222L. On the other hand, the first pushing members 137 may move at a common speed and along a common locus as they push the articles P from a position immediately before the feeding section 112B to the feeding section 112B. More specifically, until reaching to a position immediately before the feeding section 112B, each of the first pushing members 137 may move at a speed that is faster than the moving speed of the second pushing members 222. However, as the first pushing member 137 moves further toward the feeding section 112B, the roller 135 may engage the cam groove 126A, so that the tip end portion 137A may tilt rearward. As a result, the moving speed of the tip end portion 137A may be lowered. In addition, because the first pushing member 137 may start to move upward along the front side curved rail 124 (see FIG. 1), a component in the horizontal direction of the moving speed of the tip end portion 137A of the first pushing member 137 may be reduced. Therefore, the tip end portion 222A of each of the second pushing members 222 may rise to extend across and above the support surface 202 while it overlaps with the restricting members 139 of the first pushing member 137 as viewed perpendicular to the pushing direction. Hence, within the transition region from the lower linear rail 123 to the front side curved rail 124, the travelers 130 move along the circulation track 122 without pushing the articles P by the tip end portions 137A of the first pushing members 137. After passing the transition region, each of the travelers 130 having the first pushing member 137 moved upward away from the articles P move toward the preceding traveler 130, and the distance between any two adjacent travelers 130 come to be a predetermined distance when the travelers 130 move along the upper linear rail 123.

According to the embodiment described above, the following advantages may be achieved:

(i) If the result of determination at the determination section 144 is NO, a pair of the travelers 130 are associated with the detected article P such that the first pushing member 137 of one of the two travelers 130 moves on the front side of the detected article P, and the distance 137L between the first pushing members 137 of the two travelers 130 and the moving speed of both of the first pushing members 137 are adjusted to match the process timing of the processing apparatus. Therefore, one of the travelers 130 is always positioned to precede the leading article P, and therefore, even when the moving speed of the traveler 130 pushing the leading article P has been reduced, the leading article P cannot move away by a large distance from the first pushing member 137 of the traveler 130 that has pushed the leading article P and positioned on the rear side of the leading article P, while the distance 137L between the first pushing members 137 and the moving speed of each of the first pushing members 137 is adjusted to feed the article P to the feeding section 112B so as to match the process timing of the processing apparatus. In this way, the first pushing members 137 of the travelers 130 moving independently of each other can feed the articles P one after another to match the process timing of the processing apparatus.

(ii) After arrival of each of the articles P at a position immediately before the feeding section 112B, each of the first pushing members 137 push the article P to the feeding section 112B in a fixed motion. Therefore, it is possible to ensure that each of the articles P is fed to the feeding section 112B at timing that matches the process timing of the processing apparatus. The first pushing members 137 may move in a fixed motion or a non-fixed motion along the conveying bed 110 during the movement in a region spaced rearwardly away from the feeding section 112B (i.e., until arriving at a position immediately before the feeding section 112B). Therefore, even in the case where the supply of the articles P from the preceding step is not regularly made, the articles P can be fed at timing that matches the process timing of the processing apparatus.

(iii) When each of the travelers 130 moves from the lower linear rail 123 to the front side curved rail 124 arranged next to the lower linear rail 123, the tip end portion 137A of the first pushing member 137 of each of the travelers 130 does not push the article P. Therefore, the undesirable displacement of the articles P can be avoided.

(iv) During the movement of the tip end portion 222A of each of the second pushing members 222 after extending across and above the conveyor surface 112 and before finishing the rising movement, the restricting portion 139 of the first pushing member 137 of the corresponding traveler 130 moves in the pushing direction without contacting the second pushing member 222 while it overlaps with the second pushing member 222 as viewed perpendicular to the pushing direction. Therefore, interference between the second pushing members 222 and the first pushing members 137 can be avoided.

The above embodiment may be modified in various ways, for example, as follows:

(1) Although an overhead-type conveyor is used as the second conveyor 120, any other type of conveyor can be used as the second conveyor 120. For example, the second conveyor 120 may be a conveyor configured to circulate the first pushing members 137 within a horizontal plane for pushing and transferring the articles P. Alternatively, the second conveyor 120 may be configured such that the first pushing members 137 move upward across the flat conveying surface 112 from the lower side of the first conveying bed 110.

Although the supply conveyor 200 for the processing machine is an endless cable having the second pushing members 222 attached thereto, the supply conveyor 200 may have a different configuration. For example, in the case that the processing machine is a horizontal form-fill-seal packaging machine, various conveyor devices can be used as long as they can convey the articles P at predetermined intervals that may be determined in relation to engaging timing of a pair of sealers of a horizontal seal device for preventing engagement of the articles P by the pair of sealers. For example, an endless belt conveyor having no second pushing member 222, a conveyor for circulating the second pushing members 222 within a horizontal plane, a conveyor having a pair of endless belts holding the articles P from their left and rights sides may be used as the supply conveyor 200.

Although the articles P are discharged from the manufacturing apparatus at irregular intervals to the first conveyor 100 in this embodiment, the manufacturing apparatus may discharge the articles P at regular intervals.

Although the first conveyor 100 is is a belt conveyor for conveying the articles P to the receiving section 112A, the first conveyor 100 may be replaced with a chute through which the articles P slide down to the receiving section 112A.

Although a horizontal form-fill-seal packaging machine was disclosed as an example of the processing machine, the conveying apparatus may be used in conjunction with any other processing machines, such as a cartoner.

In the above embodiment, the timing acquisition section 142 of the controller 140 of the conveying apparatus acquires, as the process timing of the processing machine, the pulse information (more specifically, an encoder pulse count value) of the encoder 204 disposed at the supply conveyor 200. However, the information regarding the process timing can be obtained from different information, such as opening and/or closing timing of the end sealer. Thus, in the case of the horizontal form-fill-seal packaging machine, the process timing for packaging the articles can be acquired via various information regarding various operations during the packaging process, which are synchronized with each other. For example, the opening/closing timing of the end sealer, the conveying speed of the articles and the conveying distance of each article by the supply conveyor 200, the feeding speed of the packaging film and the moving distance of each article until reaching the end sealer after placed onto the film, or timing of the arrival of each article at the end sealer, etc. may be used.

Although each of the first pushing members 137 is configured to push only one article P, each first pushing member 137 may push a plurality of articles P that may be arranged in the front-to-rear direction with respect to the pushing direction or arranged in the left-to-right direction crossing the pushing direction, or may be stacked in the vertical direction. Therefore, each of the first pushing members 137 may push at least one article P.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved conveying apparatuses, and methods of making and using the same.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

What is claimed is:

1. A conveying apparatus comprising:
   a support section configured to support a plurality of articles thereon and disposed between a receiving section for receiving the articles and a feeding section for feeding the articles to a processing machine;
   a detection section configured to detect an arrival of each of the articles at the receiving section;
   a circulation track including a magnetic field generating device configure to generate a magnetic field;
   a plurality of travelers moveably disposed along the circulation track and configured to move independently of each other along the track in response to driving forces produced by the magnetic field generating device, wherein each of the travelers comprises a first pushing member;
   wherein the plurality of travelers are configured to push the articles arriving at the receiving section one after another to move the articles to the feeding section along the support section;
   a controller configured to adjust a distance between each pair of adjacent travelers and a travelling speed of each of the travelers during the movement of the articles along the support section in a forward direction so that the articles are fed from the feeding section to the processing machine to match article process timing at predetermined intervals of the processing machine;
   wherein the controller is configured to associate one of the travelers with each of the articles before arriving at the receiving section in response to detection information from the detection section and to output a command so that, when each of the articles arrives at the receiving section, a driving force is applied to the traveler associated with the arrived article in order to push the corresponding article to reach the feeding section;
   wherein the controller comprises:
   a timing acquisition section configured to acquire information regarding the article process timing of the processing machine; and
   a determination section configured to determine, in conjunction with the association of any one of the travelers to each of the articles and based on the information regarding the process timing, whether the article subjected to the association can arrive at the feeding section at the process timing for arrival at the feeding section, which is directly subsequent to the process timing when the article directly preceding the article subjected to the association arrives at the feeding section;
   wherein if the determination by the determination section is that the article subjected to the association cannot arrive at the feeding section at the process timing for arrival at the feeding section, in order that another one of the first pushing members, which is different from the first pushing member pushing the article subjected to the association, travels on a front side of the article subjected to the association, the controller is configured to associate the article subjected to the association with two of the plurality of travelers, and the controller is configured to adjust a distance in the moving direction between the first pushing member pushing the article subjected to the association and the other one of the first pushing members and the moving speeds thereof to match the article process timing of the processing machine.

2. The conveying apparatus according to claim 1, wherein:
one of the first pushing members is moved according to a fixed motion to push the article subjected to the association to the feeding section after the article subjected to the association has reached to a position immediately before the feeding section.

3. The conveying apparatus according to claim 2, wherein:
the other first pushing member positioned at the support section on the rear side of the first pushing member that pushes the article subjected to the association and has reached to a position immediately before the feeding section is moved according to a fixed motion or a non-fixed motion to push the corresponding article.

4. The conveying apparatus according to claim 1, wherein:
each of the travelers includes a first engaging member and rotatably supports the first pushing member; and
the circulation track includes a linear track extending parallel to the support section and a curved track connected to the linear track;
wherein the conveying apparatus further comprises a second engaging member configured to engage the first engaging member of each of the travelers, wherein the second engaging member is disposed along the circulation track within a transition region for transition from the linear track to the curved track, wherein the transition region is opposed to the feeding section;
wherein each of the travelers is configured such that a tip end portion of the first pushing member moves rearward as the first engaging member engages the second engaging member.

5. The conveying apparatus according to claim 1, wherein:
the processing machine includes a conveyor including a supporting surface and a plurality of second pushing members configured to push the articles at predetermined intervals, wherein the supporting surface is coupled to the support section on a downstream side thereof to define a conveying path for the articles in series with the support section;
each of the second pushing members is configured such that a tip end portion of each second pushing member enters the conveying path from an upstream side of the feeding section, an orientation of the tip end portion is gradually changed as the tip end portion moves toward a downstream side, and the tip end portion reaches to an uprise position upon arrival at the feeding section;
each of the first pushing members includes a restricting portion extending rearward from a tip end portion thereof;
the restricting portion has a length that is less than a distance between two adjacent first pushing members in the pushing direction minus a length of each article in the pushing direction; and
the restricting portion is configured to move in a pushing direction without contacting the second pushing members while the restricting portion overlaps with one of the second pushing members as viewed in a direction crossing the pushing direction after the tip end portion of each of the second pushing members starts to enter the conveying path and before the tip end portion completes to uprise.

6. A conveying apparatus comprising:
a support section configured to support a plurality of articles thereon and positioned between a receiving section for receiving the articles and a feeding section for feeding the articles to a processing machine,
a detection section configured to detect an arrival of each of the articles at the receiving section and to output a detection signal;
a circulation track including a magnetic field generating device configured to generate a magnetic field;
a plurality of travelers movable along the circulation track independently of each other, wherein the plurality of travelers are configured to move in response to driving forces produced by the magnetic field of the magnetic field generating device;
a controller configured to control the movement of each of the travelers, so that, based on the detection signal of each of the articles outputted from the detection section, each of the travelers receives the detected article at the receiving section, conveys the detected article along the support section, and feeds the detected article to the processing machine at the feeding section at predetermined timing, wherein:
the controller is further configured to determine whether there exists a preceding article-conveying traveler on a front side in a conveying direction of the traveler planned for receiving and conveying the detected article, the preceding article-conveying traveler being the traveler that has received the article detected directly preceding the currently detected article; and
if the determination is that there exists no preceding article-feeding traveler, the controller controls such that (a) the traveler planned for receiving and conveying the detected article serves as a preceding no-article conveying traveler that does not receive and convey the article, and (b) the other traveler located next to the planed traveler serves as an article conveying traveler for receiving and conveying the detected article.

* * * * *